(No Model.)
N. LEIDGEN.
LUBRICATOR.
No. 591,854.    Patented Oct. 19, 1897.
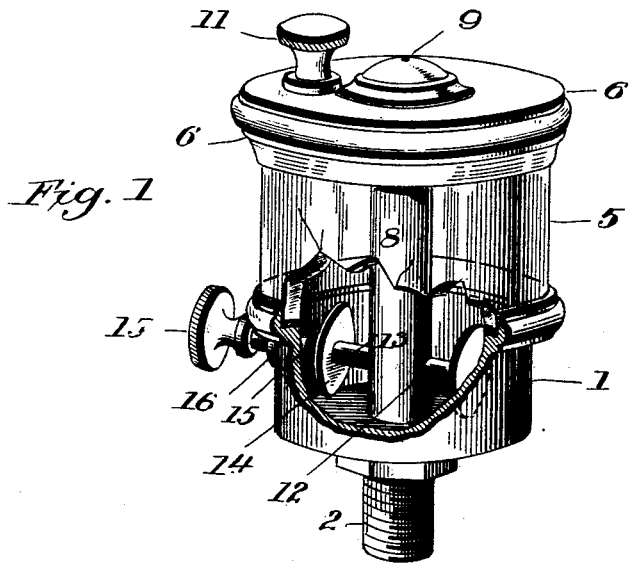
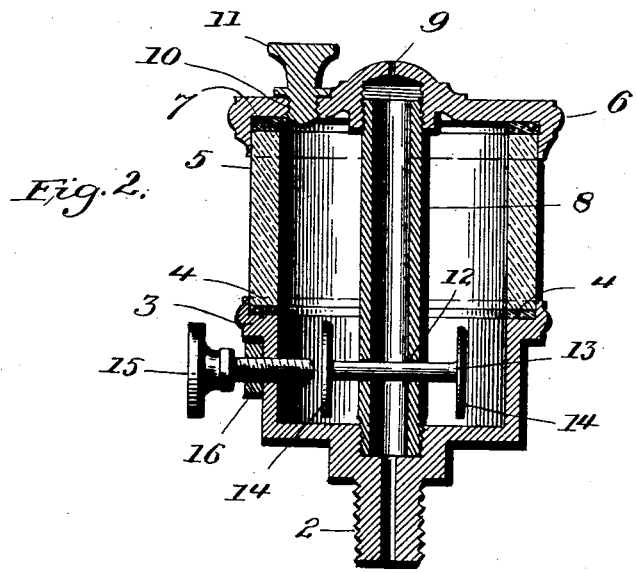

UNITED STATES PATENT OFFICE.

NICOLAUS LEIDGEN, OF MILWAUKEE, WISCONSIN.

LUBRICATOR.

SPECIFICATION forming part of Letters Patent No. 591,854, dated October 19, 1897.

Application filed April 1, 1896. Serial No. 585,804. (No model.)

*To all whom it may concern:*

Be it known that I, NICOLAUS LEIDGEN, a citizen of the United States, residing at Milwaukee, in the county of Milwaukee and State of Wisconsin, have invented certain new and useful Improvements in Lubricators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to lubricators, more particularly to that class of lubricators for use on movable bearings, such as eccentric-rods, cross-heads, and the like.

The invention has for its object to form a lubricator of the kind mentioned in which a sliding piston employed for feeding the lubricant to the tube in which the piston works will cause the oil to be fed evenly to the tube under all conditions and in which the opening in which the piston works will be prevented from gumming up.

To the accomplishment of the foregoing and such other objects as may hereinafter appear, the invention consists, primarily, in providing the piston with one or more wings designed to receive the impact of the oil in the cup as the body of the oil is given motion by the movement of the cup derived from the movement of the part to which it is attached, so that the impact of the oil against the wings will cause the piston to move back and forth and thus insure the proper reciprocation of the piston to feed the oil from the cup to the feed-tube.

The invention also consists in other features, all of which will be hereinafter particularly described and then sought to be specifically defined by the claims, reference being had to the accompanying drawings, forming a part hereof, and in which—

Figure 1 is a perspective of the lubricator with a portion of its shell or cup broken away to show the interior parts, and Fig. 2 is a vertical section through the same.

In the drawings the numeral 1 designates the base portion of the cup, which is formed with the threaded stem 2 for screwing into the movable member to which the lubricator will be attached. The upper part of this base portion is provided with a seat 3 to receive a gasket or packing 4, upon which will rest the bottom of the glass cylindrical side or body 5 of the lubricator. On the top of this glass body rests the cap 6 of the lubricator, and a gasket or packing 7 is placed between the inside face of the cap and the top edge of the glass body. The base portion, body, and cap, are held together by the central tube 8, which is threaded at both ends, one end being screwed into the bottom of the base portion and the other end into the cap, so that the several parts are thus held securely together. The cap is formed with an air-vent 9 directly over the top of the tube 8, so as to form a vent for that tube. The cap is also formed with a hole 10 for introducing the lubricant into the cup, which hole is closed by a screw-plug 11. The lower end of the tube 8 surrounds the aperture 12 in the screw-threaded stem 2, so that the oil which is admitted to the tube 8 from the cup of the lubricator can pass down through the aperture 12 to the part to be lubricated.

The oil is fed from the cup into the tube 8 by a piston 13, which passes transversely through the tube 8, so that it will lie within the cup on opposite sides of the tube 8. For the purpose of insuring the proper reciprocation of the piston 13, so as to evenly feed the oil from the cup into the tube 8, when the member to which the cup is attached is moved at a slow speed, I secure to the piston one or more wings 14, preferably two wings, one at each end of the piston. The diameter of the wings from the periphery of the piston to the periphery of the wings is greater than the diameter of the piston itself. This affords a broad surface against which the oil will impact as the lubricator is moved back and forth, and in this way such a reciprocation of the piston is obtained as will insure the proper feed of the oil from the cup to the tube, even though the cup be moved at a very slow speed. This will also prevent the hole in which the piston reciprocates from gumming up with the oil, which would be liable to occur if the cup was moved at a slow speed not sufficient to give to the piston throw enough to clear the hole of the gum in the oil that would otherwise form therein.

The extent of throw of the piston and consequently the amount of oil fed from the cup to the tube 8 in each reciprocation of the piston is controlled by means of an adjusting-pin 15, which is preferably in the form of a screw passed through the side of the base portion 1 of the lubricator parallel with the piston 13, so that by adjusting said screw the length of throw of the piston will be regulated, as the piston will come in contact with the screw in its reciprocation and thus have its movement checked. I also preferably provide a jam-nut 16, so as to hold the screw to its adjustment.

I have illustrated and described the preferred construction and arrangement of the several parts of the lubricator, but it is obvious that changes can be made in the details without departing from the essential features of my invention.

If the cup should be made entirely of brass, the tube would pass through the cover and the same would be secured by a nut, but this would not be a departure from the invention, and as the same is obvious need not be particularly illustrated.

I do not claim a pin working in a hole made transversely through a block or vertical stem and having heads to prevent the pin from working out of the hole in which it slides.

The main feature of my invention is in wings at opposite ends of the pin, and of such diameter that the reciprocation of the pin will depend principally on the impact of the oil against these wings. This differentiates the invention from oil-cups in which the change in the direction of movement of the journal is relied on to move the pin, inasmuch as in my invention it is the impact of the oil against the wings that is relied on for shifting the pin. A new principle is therefore brought into play, and to make available this principle the diameter of the flanges from the periphery of the shaft to the periphery of the wings is greater than the diameter of the shaft.

Having described my invention and set forth its merits, what I claim is—

1. In a lubricator, the combination with the oil-cup and a central feed-tube through the same, of a piston passing transversely through the tube and provided with a wing lying inside the cup to receive the impact of the oil for reciprocating the piston, the extent of the wing from the periphery of the piston to the periphery of the wing being materially greater than the diameter of the piston, substantially as and for the purposes described.

2. In a lubricator, the combination with the oil-cup and a central feed-tube through the same, of a piston passing transversely through the tube and provided with wings at its opposite ends, one on each side of the tube, to receive the impact of the oil for reciprocating the piston, the extent of the wings from the periphery of the piston to the periphery of the wings being materially greater than the diameter of the piston, substantially as and for the purposes described.

3. In a lubricator, the combination with the oil-cup and a central feed-tube through the same, of a piston passing transversely through the tube and provided with a wing lying within the oil-cup to receive the impact of the oil for reciprocating the piston, the extent of the wing from the periphery of the piston to the periphery of the wing being materially greater than the diameter of the piston, and means for regulating the throw of the piston, substantially as and for the purposes described.

4. In a lubricator, the combination with the base, body and cap, of a tube extending from the base to the cap having a vent at the cap, a piston passing transversely through the lower portion of the tube and provided at each end with wings to receive impact of oil in the cup to reciprocate the piston, and an adjustable pin passing transversely through one side of the cup in line with the wings to regulate the throw of the wings, substantially as and for the purposes described.

In testimony whereof I affix my signature in presence of two witnesses.

NICOLAUS LEIDGEN.

Witnesses:
OTTO GELHAAR,
RUDOLPH FRIEDRICHS.